United States Patent [19]

Mutoh et al.

[11] 4,022,600
[45] May 10, 1977

[54] APPARATUS FOR FREEZING COOKED RICE

[76] Inventors: Fumio Mutoh, 13-15 Minami 2-chome, Meguro, Tokyo; Hiroshi Koizumi, 3-5, Namiki 2-chome, Sagamiwara, Kanagawa; Jun Yamasaki, 11-21-305, Kurihara 2-chome, Adachi, Tokyo; Toshifumi Ando, 3-206, Koyosokushin-Kutaku Yurigaoka, Niromiya, Naka, Kanagawa, all of Japan

[22] Filed: June 21, 1976

[21] Appl. No.: 697,819

Related U.S. Application Data

[62] Division of Ser. No. 608,605, Aug. 28, 1975.

[30] Foreign Application Priority Data

May 21, 1975 Japan .............................. 50-60562

[52] U.S. Cl. .................................. 62/381; 165/20; 259/3; 259/DIG. 18; 426/524
[51] Int. Cl.² .......................................... F25D 25/02
[58] Field of Search .......... 426/444, 462, 518, 519, 426/524; 62/63, 381; 165/120; 259/3, DIG. 18

[56] References Cited

UNITED STATES PATENTS

| | | | |
|---|---|---|---|
| 2,942,429 | 6/1960 | Vandolah et al. | 62/381 X |
| 3,015,219 | 1/1962 | Veyrie | 62/381 |
| 3,089,316 | 5/1963 | Robbins | 62/381 |
| 3,097,501 | 7/1963 | Pappas | 62/381 X |
| 3,395,549 | 8/1968 | Grimes | 62/381 X |
| 3,472,041 | 10/1969 | Amerio | 62/381 X |
| 3,906,743 | 9/1975 | Schorsch et al. | 62/381 X |

*Primary Examiner*—Ronald C. Capossela
*Attorney, Agent, or Firm*—William Anthony Drucker

[57] ABSTRACT

An apparatus for freezing boiled rice has an internally bladed drum rotated at low speed and housing a bladed shaft rotated at a higher speed, the drum having covers at its inlet and outlet ends. A hopper feeds boiled rice in through the inlet cover to an inner bottom face of the drum. Pipe means feed refrigerant into the same zone of the drum. A discharge port in the outlet cover discharges frozen boiled rice and used refrigerant to the exterior.

14 Claims, 12 Drawing Figures

APPARATUS FOR FREEZING COOKED RICE

This application is a divisional application from our patent application Ser. No. 608,605 filed Aug. 28, 1975.

BACKGROUND OF THE INVENTION

1. Field of the Invention

The present invention relates to an apparatus for producing preserved foods, and particularly for the freeze preservation of cooked rice.

2. Description of the Prior Art

Hitherto, for obtaining frozen boiled rice, boiled rice was placed on a tray or the like and arranged in a predetermined form, and then frozen as it was, to be packed as a commercial product. However, this method has many disadvantages: (a) it takes much time to thaw out, (b) loosening of the rice after thawing is ineffective, and causes deterioration of the taste, (c) weighing is difficult because the boiled rice grains are solidly stuck to one another in a caked state, both before and after freezing, due to their own adhesive power, or by freezing, and (d) the boiled rice grains protrude like needles on the outer face of the frozen boiled rice, giving trouble with vacuum packing which is currently regarded as the best packing.

These disadvantages are caused by freezing the boiled rice in a caked state to make products as lumps. Accordingly, in order to eliminate the above disadvantages, it is known to have the boiled rice grains scattered by hand before being frozen, or else boiled rice is thinly leveled by hand and then frozen, and then subjected to impact so as to be crushed into a scattered state. However, this has another set of disadvantages. Since it requires a pretreatment of scattering boiled rice or leveling it into a proper thickness by hand operation, the production cost is raised; it is very difficult to perform the above pretreatment in a uniform manner, and therefore to obtain uniform products; and the application of impact for crushing of the rice deforms and pulverizes the boiled rice grains, impairing the yield and commercial value to a large extent.

SUMMARY OF THE INVENTION

An object of the present invention is to provide an apparatus which can freeze boiled rice in a scattered state.

Another object of the present invention is to provide an apparatus which can freeze boiled rice in an optimum state without finely crushing or pulverizing the boiled rice.

A further object of the present invention is to provide an apparatus for freezing boiled rice which allows easy weighing, packing and thawing.

A still further object of the present invention is to provide an apparatus which can continuously and efficiently freeze boiled rice.

A further object of the present invention is to provide an apparatus for freezing boiled rice which can save labor.

Other objects and characteristics of the present invention will be more clearly understood from the following detailed description, with reference to the accompanying drawings of a preferred embodiment given by way of explanation, and not intended to define the extent of the present invention.

DETAILED DESCRIPTION OF THE PREFERRED EMODIMENT

Figure 1:
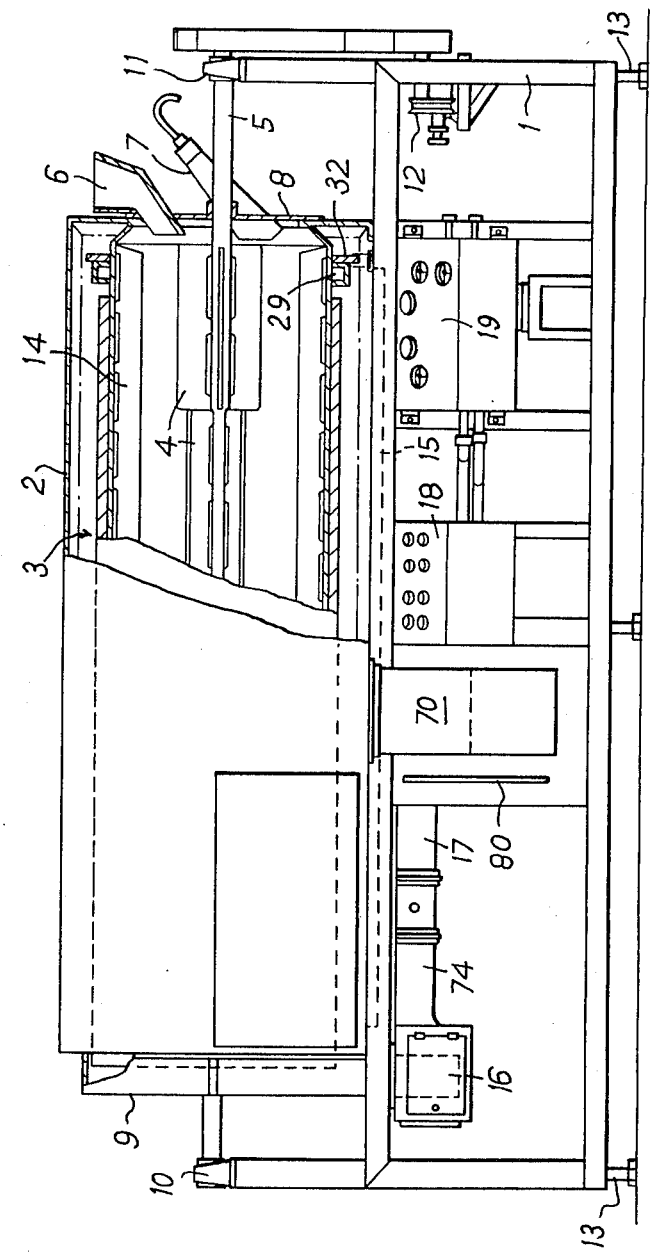
FIG. 1 is a side view of a freezing apparatus according to the present invention showing a drum cover, a rotary drum, a hopper, an inlet cover, and an outlet cover, parts being cut away for clearness.

The accompanying drawings show an embodiment of the present invention, and FIG. 1 is a side view of the entire construction of the apparatus, partially broken away. In this illustration, reference numeral 1 is a mount, 2 is a drum cover mounted on the upper face of the mount 1, and 3 is a rotary drum rotatably placed in the drum cover 2. In the center of the rotary drum 3 there is inserted a rotary shaft 5 axially formed with a plurality of rotary blades 4. At one open end of the rotary drum 3, an inlet cover 8 equipped with a hopper 6 for boiled rice and a supply pipe 7 for supplying refrigerant such as liquefied carbon dioxide is provided, while at the other open end of the rotary drum 3, there is provided an outlet cover 9 for discharging outside the frozen product and the refrigerant which has frozen it. The rotary shaft 5 is set in the bearings 10 and 11 attached to the mount 1, and is arranged to be rotated at a relatively high speed by a motor 12, whilst the rotary drum 3 is arranged for rotation at a relatively low speed. The rotary shaft 5 rotates the rotary blades 4 fixed thereto, to impact the boiled rice for scattering the grains thereof individually. In an experiment, the speed of the rotary blades 4 was 200–600 rpm in the case of the diameter of the blades 4 being 30cm (about 3–10m/s in terms of circumferential speed), and was preferably 300–400 rpm (about 4.5–6.3m/s in terms of circumferential speed). A speed of 200 rpm or less is not sufficient to prevent adhesion between boiled rice grains and to scatter them individually, and a speed of 600 rpm or more gives too much impact, resulting in an increase in too fine grains of the boiled rice grains, with a drop in commercial value. The rotary drum 3 carries boiled rice upward by the plate blades 14 radially protruding on the inner circumferential wall thereof, and makes it fall on the rotary blades 4 rotating at a high speed. If the diameter of the rotary drum 3 is about 80cm, and the width of the plate blade 14 is 10cm, the proper speed is 10–20 rpm (about 0.4–0.9m/s in terms of circumferential speed), and a lower speed lowers the capacity. A higher speed does not allow the boiled rice to fall on the rotary blades 4, due to the centrifugal force. The drive unit and the support mechanism of the rotary drum 3 will be described in detail later herein. In the embodiment illustrated, it is desirable to have the rotational direction of the rotary shaft 5 the reverse of that of the rotary drum 3, but this is not critical. In the illustration, 13 is an adjusting bolt for allowing the adjustment of the tilt angle of the mount 1 (rotary drum 3); 15 designates a water plate placed on the mount 1 in the drum cover 2; 16 is a discharge port for the frozen products and refrigerant, provided in the outlet cover 9; 17 is an exhaust duct opening around the discharge port 16 and in the drum cover 2; and 18 and 19 are operation boards for the electric system and valves.

Figure 2:
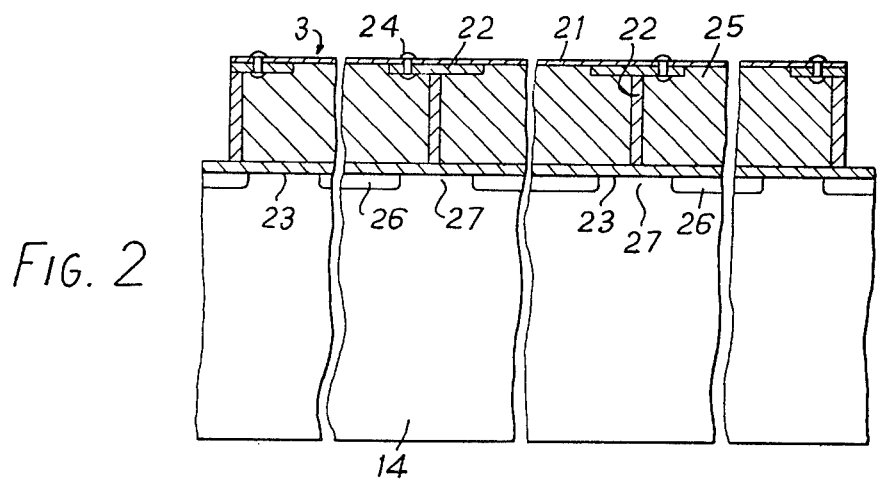
FIG. 2 is a sectional view showing the structure of the rotary drum and the mounting mechanism of the plate blade.

The sectional structure of the above-mentioned rotary drum 3 and the mounting structure of the plate blades 14 are shown in FIG. 2. In the illustration, 21 is an insulating cover, 22 a cover mounting seat for setting the insulating cover 21 on the outer circumferential face of the drum body 23 with a proper clearance by rivets 24; and 25 an insulating material suh as hard polyurethane filled into the clearance between the drum body 23 and the insulating cover 21. With this structure employed for the rotary drum 3, the loss of cold is prevented to reduce the consumption of refrigerant. The plate blade 14 is normally attached to the rotary drum 3 by welding or screws, etc., and the formation of the clearance 26 is convenient since it facilitates the removal of extraneous matters, such as leftovers of boiled rice at the time of washing and keeps small the thermal distortion to be caused by welding heat. 27 is the weld zone between the plate blade 14 and the rotary drum 3.

Figure 3:
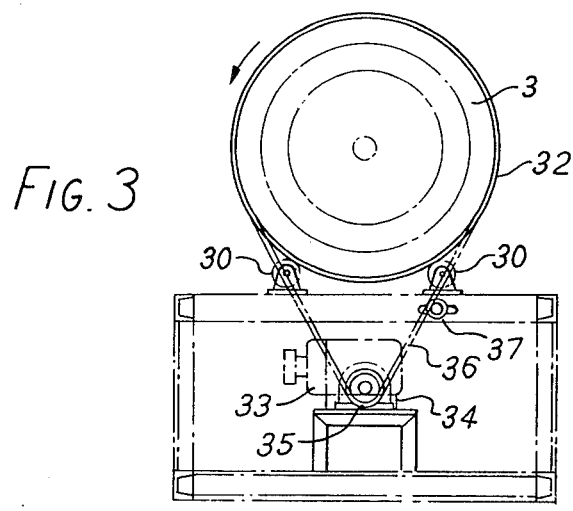
FIG. 3 is a front view showing the drive unit and support mechanism of the rotary drum.
Figure 4:
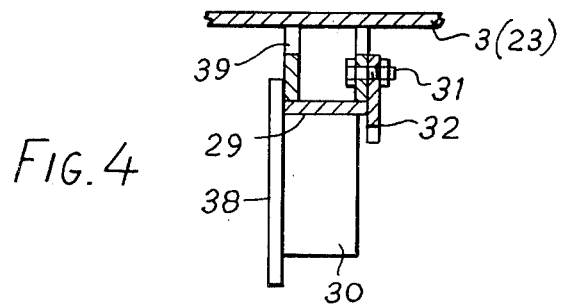
FIG. 4 is a sectional view showing the relationship between a circular rail attached to the rotary drum, a sprocket wheel attached to it, and support rollers.

The rotary drive unit and support mechanism of the rotary drum 3 are shown in FIGS. 3 and 4. In these figures, 29 is a circular rail secured to the outer circumferential face of the rotary drum 3 (strictly, the drum body 23) by welding or the like, and placed in contact with the rails 29 are support rollers 30 for rotatably supporting the rotary drum 3 on the mount 1. The circular rails 29 are provided at the front and rear ends of the rotary drum 3, and are guided by the support rollers 30 positioned at both sides of the front end of the mount 1 and at both sides of the rear end thereof, for rotating the rotary drum 3. To one side wall of the circular rail 29 attached on the front end of the rotary drum 3 a sprocket wheel 32 is secured by a bolt 31, and is connected to the sprocket wheel 35 of the speed change gear 34 connected to the motor 33, through a chain 36. 37 is a tension pulley for adjusting the tension of the chain 36; 38 denotes a flange for stopping the movement of the rotary drum 3 in the longitudinal direction, in contact with the other side wall of the circular rail 29; and 39 are weld zones to weld the annular rail 39 to the rotary drum 3. The weld zones 39 are provided intermittently at required intervals in the circumferential direction of the annular rail 39, to fasten the circular rail 29 to the drum 3.

Figure 5:
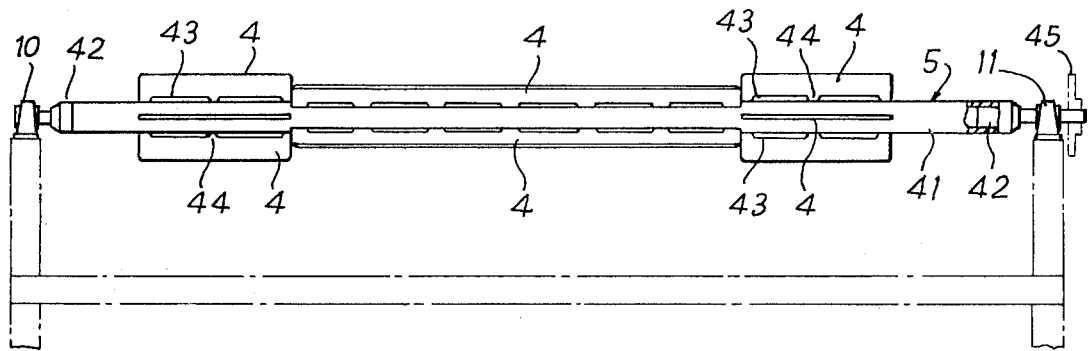
FIG. 5 is a partly cutaway side view of a rotary shaft with a shaft pipe, and rotary blades.
Figure 6:
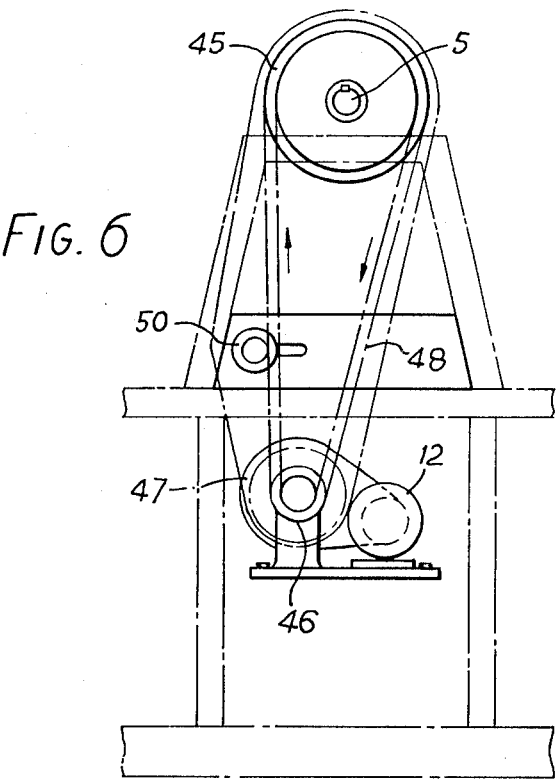
FIG. 6 is a front view of the drive unit of the rotary shaft.

The detailed structure of the aforesaid rotary shaft 5 and the structure of its drive unit are shown in FIGS. 5 and 6. The shaft 5 is constructed in such a fashion that rods 42 are fitted in both end openings of a shaft pipe 41 and integrally joined to the shaft pipe by welding or any other means as one integral unit. Such structure of the rotary shaft 5 reduces the weight and cost, and aims at saving refrigerant by lessening the thermal capacity of the rotary shaft 5. The rotary blades 4 attached radially around the rotary shaft 5 in several groups are provided with the phases different among the groups. The rotary blades 4 are rotated at such a high speed as mentioned above as to prevent the mutual adhesion of boiled rice grains and to separate the boiled rice grains stuck to one another, and the above-mentioned structure makes the loads to be applied to the rotary blades 4 uniform, generally. A clearance 43 is provided for attaching the rotary blades 4 to the rotary shaft 5, for the same reason as given for the plate blade 14. 44 is a weld zone fixing the rotary blades 4 to the rotary shaft 5; 45 a sprocket wheel mounted on the front end of the rotary shaft 5; 46 a sprocket wheel provided on a speed change gear 47; and 48 is a chain connecting the sprocket wheels 45 and 46. The rotary blades 4 are so arranged as to be rotated at a high speed by the aforesaid motor 12 through the transmission means of the aforesaid speed changes gear 47 and the chain 48, etc. Numeral 50 represents an adjustable tension pulley.

Figure 7:
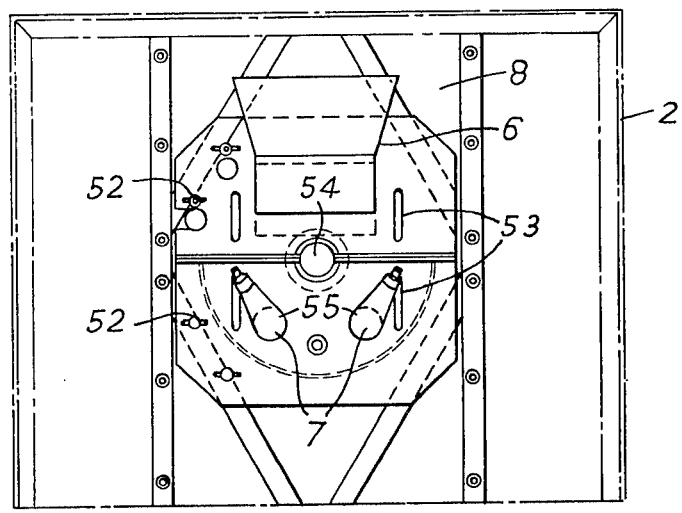
FIG. 7 is a front view of the inlet cover.

The aforesaid inlet cover 8 is shown in FIG. 7 in detail. As seen in the illustration, the inlet cover 8 is divided in upper and lower portions, and is detachable attached to the front face of the drum cover 1 by nuts 52. 53 is a grip used for mounting and dismounting of the inlet cover 8; 54 a throughhole for the rotary shaft 5 to be inserted therethrough; and 55 fitting holes in which the aforesaid supply pipes 7 are fitted. The hopper 6 is provided at the center of the upper portion of the inlet cover 8 and the supply pipes 7 are provided on both sides of the lower portion of the inlet cover 8.

Figure 8:
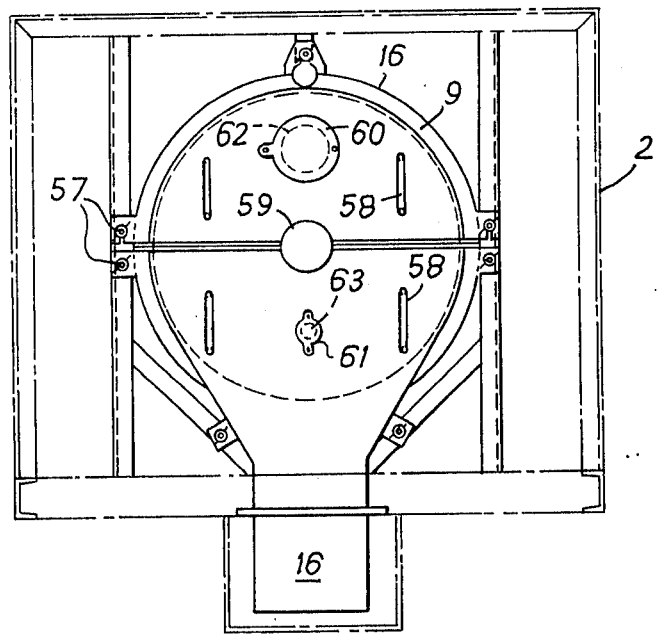
FIG. 8 is a front view of the outlet cover.
Figure 9:
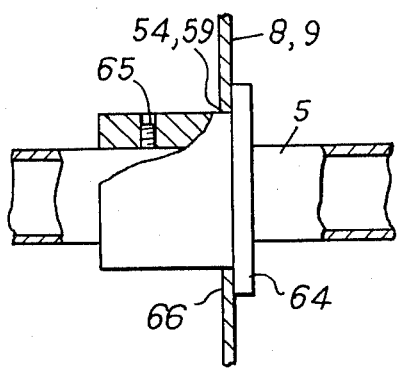
FIG. 9 is a sectional view showing the relationship between the rotary shaft, the metal ring and the cover.

The aforesaid outlet cover 9 is shown in FIG. 8 in detail. The outlet cover 9 is also divided into upper and lower portions, and is attached to the rear surface of the drum cover 1 by nuts 57 in a detachable state. Numeral 58 is a grip used for attaching and detaching of the outlet cover 9; 59 a through-hole for the rotary shaft 5 to be inserted therethrough; and 60 and 61 are cover plates for freely opening and closing viewing holes 62 and 63. The rotary drum 3 is provided in the drum cover 1, with the rear open end partly inserted in the discharge port 16 formed in the outlet cover 9 (see FIG. 1).

At the portions of through-holes 54 and 59 for the rotary shaft 5 provided in the inlet cover 8 and the outlet cover 9 respectively, flanged metallic rings 64 are secured to the shaft 5 by screws 65, to make the clearances 66 between the inner faces, the flanges of the rings and the circumferential faces of the through-holes as narrow as possible, to keep the associated portions airtight.

Figure 10:
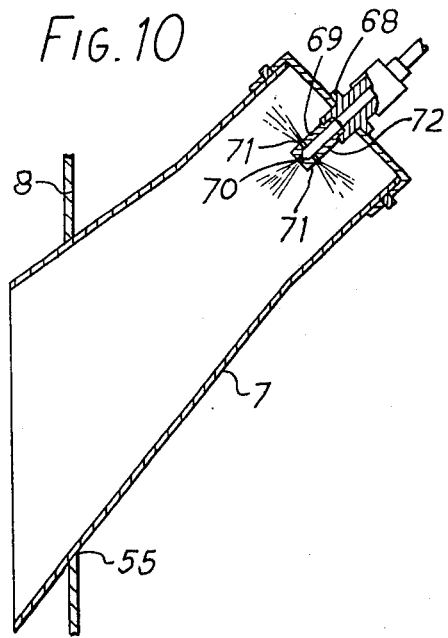
FIG. 10 is a sectional view showing the relationship between a jet nozzle, a supply pipe and the inlet cover.
Figure 11:
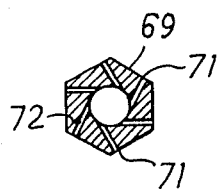
FIG. 11 is a transverse cross section of the jet nozzle.

The aforesaid supply pipe 7 has its skirt open end divergent to form a hollow frustoconical configuration as shown in FIG. 10, and fitted in the fitting hole 55 and is so inclined as to be directed to the center of the inner bottom face of the rotary drum 3 (see FIG. 7). Inside the supply pipe 7, a nozzle fitting 68 (FIG. 10) connected to the supply source (not illustrated) of refrigerant such as liquefied carbon dioxide is attached, and a refrigerant jet nozzle 69 is screwed to it. Fine holes 70 and 71 for jetting refrigerant forcibly are provided at the tip of the jet nozzle 69, and the fine holes 71, except the fine hole 70 provided at the center of the end of the jet nozzle 69, are directed tangentially of the center hole 72 as shown in FIG. 11. Such structure of the fine holes 71 serves to effectively prevent adhering of the refrigerant (dry ice) to the inner wall of the supply pipe 7 by causing a whirlwind with the jetting refrigerant.

Cooperating with the above-said whirlwind action, the aforesaid horn-like supply pipes 7 spread the refrigerant with even distribution on the inner bottom face at the falling point from the hopper side of the rotary drum 3, to obtain a favorable encounter of the refrigerant with the boiled rice. The fitting angles of the supply pipes 7 and the hopper 6 are so determined as to obtain an ideal encounter between the refrigerant and boiled rice on the inner bottom face of the rotary drum 3. The rotary drum 3 is so arranged as to start falling a little before the boiled rice and the refrigerant reach the vicinity of the top of the rotary drum, with the rotating speed set as mentioned before.

Figure 12:
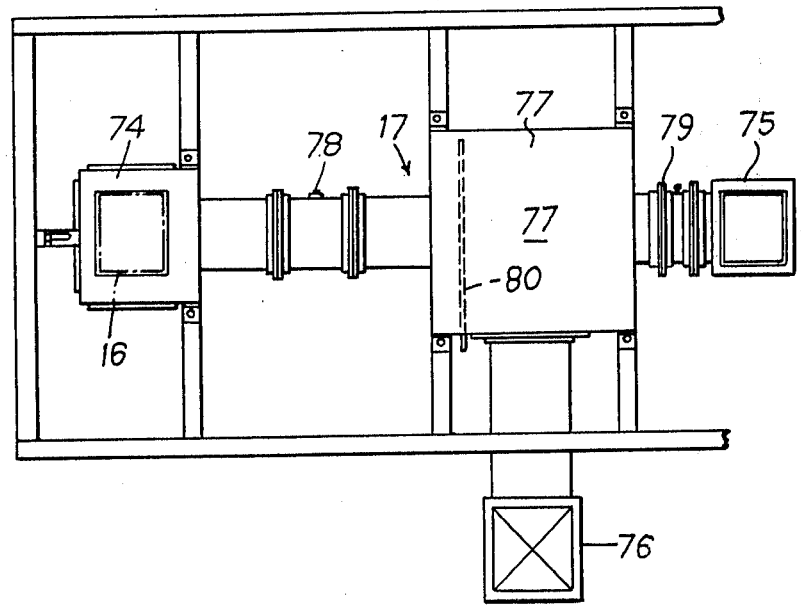
FIG. 12 is a plan view of an exhaust duct.

The plan view of the aforesaid exhaust duct 17 is shown in FIG. 12. The exhaust duct 17 is of such a construction that the suction duct 74 opening in the circumferential face of the discharge port 16, the suction duct 75 opening in the drum cover 2 and the main duct 76 connected to an exhaust fan (not illustrated) are integrally connected to one another through a drain box 77. Numerals 78 and 79 are dampers of butterfly structure incorporated in the suction ducts 74 and 75 respectively, and 80 is a baffle board slidably provided in the drain box 77. The gasified refrigerant which has served for refrigeration and has flown into the suction duct 74 collides with the baffle board 80, and drops the dust contained therein into the drain box 77.

Now follows a description of the action of the device with the above structure according to the invention.

First, the motors 12 and 33 are started to rotate the rotary shaft 5 and the rotary drum 3 in reverse directions to each other with a suitable speed, as described later herein. Then, the liquefied carbon dioxide gas is jetted into the rotary drum 3 through the jet nozzle 69. On this occasion also the exhaust fan (not shown) is operated to discharge the carbon dioxide, which is gasified in the rotary drum, from the rotary drum 3 through the exhaust duct 17.

Since the liquefied carbon dioxide gas is jetted through the fine through-hole 71 directed tangentially of the center hole 72 of the jet nozzle 69, the liquefied carbon dioxide gas passes through the horn-like supply pipe 7 in a whirlwind manner and spreads with even distribution on the inner bottom surface of the rotary drum 3, and immediately expands in the atmosphere to be snow-like dry ice. At the first step the aforesaid supplied liquefied carbon dioxide gas (snow-like dry ice) lowers the temperature of the inside of the rotary drum 3 near to its proper point.

Subsequently, the boiled rice is supplied into the rotary drum 3 through the hopper 6.

The fitting angles of the supply pipe 7 and the hopper 6 are determined so as to obtain an ideal encounter between the supplied snow-like dry ice and the supplied boiled rice.

The boiled rice grains adhere to each other, since the boiled rice grain is very adhesive, unlike peas, corn kernels beans and other foods.

The boiled rice which is supplied into the rotary drum 3 in the rotary drum 3 in the above state, drops onto the dry ice spreading on the inner bottom surface of the rotary drum 3 from the hopper 6 and, therefore, is effectively cooled thereby. The snow-like dry ice adheres to the outer surface of the boiled rice grains and prevents the grains from combining with each other. The boiled rice is carried upwardly together with the snow-like dry ice by the plate blades 14 on the inner wall of the rotary drum 3 by the revolution of the rotary drum 3. When the boiled rice and the snow-like dry ice reach the vicinity of the top of the rotary drum 3 by its rotation, they drop onto the rotary blades since the plate blades are arranged in a manner to be headed for the central axis of the rotary drum 3. Owing to the impact of the rotary blades 4, which rotate in a reverse direction with respect to the rotation of the drum 3, against the dropped rice, the boiled rice grains are separated individually.

The circumferential speed of rotation of the rotary drum 3 must be preferably controlled within a range of about 0.4–0.9 meters per second in order that the boiled rice and the snow-like dry ice drop exactly onto the rotary blades 4.

A circumferential speed less than 0.4 m/s is not useful since the boiled rice cannot be carried up to the vicinity of the top of the rotary drum 3. However, on the other hand, a circumferential speed greater than 0.9 m/s is also not useful in that the boiled rice cannot exactly fall on the rotary blades 4 due to too much centrifugal force. Furthermore, in the case where the rotary blades 4 rotate in the same direction with respect to the rotary drum 3, the separation of the boiled rice grains is not sufficient because the impact force of the rotary blade against the rice is not so intense. Contrary to the above, where the rotary blades 4 rotate in the reverse direction with respect to that of the drum 3, the impact force is extremely increased and the separation is substantially completed.

In the above, attention must be paid to the rotating speed of the rotary blades 4 in order to remove the following disadvantages. That is, provided that the circumferential speed of rotation of the rotary blades 4 is less than 3 m/s, the impact force of the rotary blades 4 against the rice is not sufficient for separation of the boiled rice grains.

On the other hand, where the circumferential speed of rotation of the rotating blades 4 is more than 10 m/s, the impact force is too much, being thereby to liable to crush the rice grains into pieces.

With the proper setting for the circumferential speed of rotation of the blades 4, the boiled rice grains are properly separated individually by the impact force, and then they are gradually frozen as they are conveyed toward the other end of the drum 3 by means of the dry ice, wherein the surfaces of the boiled rice grains are frozen so that they never adhere to the inner wall of the drum 3. In the above, the adhesion of the boiled rice grains to the inner wall of the drum 3 never occurs when the dry ice is carried therewith.

Thus, the boiled rice grains are separated and carried and reach the outlet cover 9 due to the inclination of the rotary drum 3.

To be more precise, due to the inclination of the rotary drum 3, when the rice grains are carried upwardly to the vicinity of the top of the rotary drum 3 from the bottom, they advance in horizontal position. Therefore, they drop in an advanced position toward the outer cover 9 in the rotary drum 3. By repeating the cycle in which the boiled rice grains are carried upwardly to the vicinity of the top of the rotary drum 3 and drop onto the rotary blades 4, the boiled rice grains are gradually conveyed toward the outlet cover 9. Then, the separated rice grains are discharged outside through the discharge port 16.

As described in detail above, the boiled rice grains are completely frozen during the entire travel through the rotary drum 3 from the inlet to the outlet. However, our experiments have taught that it is not necessary to completely freeze them from their separation, but is sufficient to freeze only their outer surface, i.e. a so-called crust freezing state.

Therefore, from the economical view, that is, the reduction of the liquefied carbon dioxide gas employed, it is to be understood that this process is very advantageous. As an alternative to the above, where the boiled rice grains are discharged without completely freezing, they are, as previously described, frozen to a desired extent by means of a mechanical refrigerating system. The liquefied carbon dioxide gas which froze the boiled rice is gasified in the rotary drum and is discharged outdoors through the exhaust duct 17.

The quantity of liquefied carbon dioxide gas supplied into the rotary drum 3 is regulated properly in relation to both the degree of refrigeration of the boiled rice and the quantity of boiled rice supplied. However, in the above, the quantity of liquefied carbon dioxide gas should be determined so as to be completely gasified at the outlet.

The above embodiment employs liquefied carbon dioxide gas as refrigerant, as mentioned above, but low temperature liquefied gas such as liquid nitrogen can also be used, and has the same effect as the liquefied carbon dioxide gas.

In order to regulate the degree of the refrigeration and/or to deal with a different quantity of boiled rice, the time duration for which the boiled rice stays in the rotary drum 3 must be controlled. To shorten the time duration, the tilt angle of the rotary drum 3 is made larger by operating the adjusting bolt 13, and on the contrary, to make it longer, the tilt angle is made smaller.

We claim:

1. An apparatus for freezing boiled rice, which comprises:
    a rotary drum having a plurality of plate blades radially provided on an inner circumferential wall of said rotary drum;
    drive means for rotating said rotary drum at a substantially low speed;
    a rotary shaft axially centrally provided through said rotary drum and having a plurality of rotary blades radially secured thereto, means for rotating said rotary shaft at a higher speed than said rotary drum;
    first and second covers provided, respectively, on an inlet side end and outlet side end of said rotary drum to cover the respective ends;
    a hopper provided in said inlet cover in such a fashion as to feed boiled rice toward a central portion of an inner bottom face of said rotary drum, at least one supply pipe provided in said inlet cover for supplying refrigerant as low temperature liquefied gas such as carbon dioxide toward the same central portion of the inner bottom face of said rotary drum; and
    a discharge port divided in said outlet cover for discharging together the boiled rice thus frozen and the used refrigerant to the outside.

2. The apparatus for freezing boiled rice according to claim 1, in which said rotary drum is surrounded by an insulating material.

3. The apparatus for freezing boiled rice according to claim 1, in which said plate blades are each provided with clearance between a base portion thereof and the rotary drum.

4. The apparatus for freezing boiled rice according to claim 1, in which said rotary blades are each provided with clearance between a base portion thereof and an outer face of said rotary shaft.

5. The apparatus for freezing boiled rice according to claim 1, in which said rotary blades are disposed in a plurality of groups and are attached to the rotary shaft with the respective phases different among the groups.

6. The apparatus for freezing boiled rice according to claim 1, in which said rotary shaft comprises a shaft pipe and a pair of rod members fitted in end openings of said shaft pipe and integrally joined thereto.

7. The apparatus for freezing boiled rice according to claim 1, further comprising a plurality of support rollers provided on a mount member thereof for supporting said rotary drum.

8. The apparatus for freezing boiled rice according to claim 7, in which said rotary drum comprises a plurality of annular rails circumferentially provided on the outer wall thereof and arranged in contact with said support rollers.

9. The apparatus for freezing boiled rice according to claim 7, in which said mount member includes a plurality of bolt means provided between said mount member and the ground for adjusting the tilt angle of the mount member.

10. The apparatus for freezing boiled rice according to claim 7, in which said supply pipe for the refrigerant has a body of a hollow frustoconical configuration with a skirt opened divergent.

11. The apparatus for freezing boiled rice according to claim 7, in which said supply pipe for refrigerant includes a jet nozzle provided therein for jetting the refrigerant through an axial hole thereof.

12. The apparatus for freezing boiled rice according to claim 11, in which the jet nozzle has at least one fine throughhole opening on a side wall thereof tangentially of said axial hole for jetting the refrigerant in a whirlwind manner.

13. The apparatus for freezing boiled rice according to claim 7, further comprising a drum cover secured to the mount member for accommodating said rotary drum, which drum has the inlet and outlet covers secured to the drum cover.

14. The apparatus for freezing boiled rice according to claim 7, in which said discharge port is provided with an exhaust duct for discharging used refrigerant.

* * * * *